United States Patent [19]

Lambeth et al.

[11] Patent Number: 5,344,706
[45] Date of Patent: Sep. 6, 1994

[54] MAGNETIC RECORDING MEDIUM COMPRISING AN UNDERLAYER AND A COBALT SAMARIUM AMORPHOUS MAGNETIC LAYER HAVING A SMCO$_5$ CRYSTALLINE INTERFACE WITH THE UNDERLAYER

[75] Inventors: David N. Lambeth, Webster, N.Y.; E. M. T. Velu, Pittsburgh, Pa.

[73] Assignee: Carnegie Mellon University, Pittsburgh, Pa.

[21] Appl. No.: 975,132

[22] Filed: Nov. 12, 1992

Related U.S. Application Data

[63] Continuation of Ser. No. 769,550, Oct. 1, 1991, abandoned.

[51] Int. Cl.$^5$ .................................. G11B 5/00
[52] U.S. Cl. ............................. 428/336; 428/611; 428/663; 428/665; 428/667; 428/668; 428/694 T; 428/694 TM; 428/694 TS; 428/694 TP; 428/900; 428/928
[58] Field of Search ............... 428/694, 695, 900, 667, 428/663, 635, 611, 668, 336, 694 T, 694 TM, 694 TS, 694 TP, 928, 665

[56] References Cited

U.S. PATENT DOCUMENTS

| | | | |
|---|---|---|---|
| 3,615,911 | 10/1971 | Nesbitt et al. | 148/31.57 |
| 4,287,225 | 9/1981 | Kneller et al. | 427/48 |
| 4,414,287 | 11/1983 | Kneller et al. | 428/650 |
| 4,560,624 | 12/1985 | Güttner et al. | 428/632 |
| 4,735,840 | 4/1988 | Hedgcoth | 428/65 |
| 4,820,584 | 4/1989 | Morita et al. | 428/336 |
| 4,883,711 | 11/1989 | Shiroishi et al. | 428/336 |
| 5,147,732 | 9/1992 | Shiroishi et al. | 428/668 |

OTHER PUBLICATIONS

Nathan Belk et al, J. Appl. Phys. 59(2) Jan. 15, 1986 p. 551.
W. T. Maloney, IEEE Transactions on Magnetics vol. Mag 15 No. 6 Nov. 1979, p. 1546.
M. Gronau et al., IEEE Transactions on Magnetics, vol. Mag-20, No. 1, Jan. 1984.
W. T. Maloney, IEEE Transactions on Magnetics, vol. Mag-15, No. 3, Jul. 1979, p. 1135.
David E. Laughlin, IEEE Transactions on Magnetics, vol. 27, No. 6, Nov. 1991, p. 4713.

*Primary Examiner*—Stevan A. Resan
*Attorney, Agent, or Firm*—Kirkpatrick & Lockhart

[57] ABSTRACT

The present invention pertains to a thin film media structure for low noise high density longitudinal magnetic recording. The thin film media structure is comprised of a substrate. The thin film media structure is also comprised of an underlayer in contact with the substrate. Additionally, the thin film media structure is comprised of a CoSm or a CoSmQ film in contact with the underlayer such that the underlayer is between the substrate and the CoSm or CoSmQ. In a preferred embodiment, the underlayer is made of Cr or W and there is additionally an overlayer in contact with the CoSm or CoSmQ film, an overcoat in contact with the overlayer and an organic lubricant disposed on the overcoat. The present invention also pertains to a low noise high coercivity media structure for longitudinal magnetic recording. The high coercivity media structure is comprised of a substrate. The high coercivity media structure is also comprised of a multi-magnetic layer comprised of at least two layers of an alloy of Co and Sm, or Co and Sm and Q with an intermediate layer therebetween, and an underlayer in contact with the substrate and between the substrate and one of the CoSm layers.

16 Claims, 8 Drawing Sheets

MAGNETIC RECORDING MEDIUM COMPRISING AN UNDERLAYER AND A COBALT SAMARIUM AMORPHOUS MAGNETIC LAYER HAVING A SMCO5 CRYSTALLINE INTERFACE WITH THE UNDERLAYER

This is a continuation of copending application 07/769,550 filed on Oct. 1, 1991, now abandoned.

FIELD OF THE INVENTION

The present invention is related to thin films for longitudinal recording. More specifically, the present invention is related to CoSm-based high-coercivity media for longitudinal magnetic recording.

BACKGROUND OF THE INVENTION

Co-based thin-film longitudinal metal media, CoP, CoNiCr, CoNiPt, CoCrTa, and CoCrPt, are gaining increased importance for high-density hard-disk recording due to their relatively large magnetization, high coercivity, and smooth surface as compared to the conventional Co-modified iron oxide particulate media. The achievable linear density in longitudinal recording medium is limited by the demagnetizing field associated with the recorded bits (transitions) but the recorded-bit cell length can be made shorter with a thin medium possessing high coercivity (M. L. Williams and R. L. Comstock, in *Magnetism and Magnetic Materials*, 1971 (Chicago), AIP Conf. Proc. No. 5, edited by D. C. Graham and J. J. Rhyne (AIP, New York, 1972), p. 738). Also, media noise in thin films, which is attributed mainly to inhomogenieties, grain size and intergranular exchange coupling, (T. Chen and T. Yamashita, IEEE Trans. Magn. MAG-24, 2700 (1988) must be minimized by a suitable microstructure control in order to increase the usable limit of the linear density.

Currently, most of the practical low-noise media possess coercivities of less than 1500 Oe. Coercivities of greater than 1500 Oe have been reported for Co alloys containing Pt up to 45 wt. %. (T. Yogi, C. Tsang, T. A. Nguyen, K. Ju, G. L. Gorman, and G. Castillo, IEEE Trans. Magn. MAG-26, 2271 (1990); J. K. Howard, J. Appl. Phys. 63, 3263 (1988)) Recently, for CoNiCr films coercivity as high as 2300 Oe has been reported but no recording properties are reported. (N. Tani, M. Hashimoto, M. Ishikawa, Y. Ota, K. Nakamura, and A. Itoh, IEEE Trans Magn MAG-26, 1282 (1990) In the future as the head-medium spacing and read-back gap are reduced, significant increases in linear recording densities will be possible if media coercivities are increased. Of course, this can only be accomplished if media noise can be further decreased by maintaining very fine magnetically noncoupled grains. The present invention describes a film structure and process variables necessary to obtain thin (<50 nm) CoSm films by sputtering with high coercivities and with very fine grains or an amorphous structure. Cobalt samarium alloys exhibit high magnetic anisotropy in both the amorphous and crystalline states, (F. J. Cadieu, T. D. Cheung, L. Wickramasekara, N. Kamprath, H. Hegde, and N. C. Liu, J. Appl. Phys. 62, 3866 (1987); E. A. Nesbitt and J. H. Wernick, *Rare Earth Permanent Magnets* (Academic, New York, 1973) and therefore it may be easier to prepare thin CoSm films with higher in-plane coercivities than is possible with simple transition-metal Co-based alloys. Evaporated amorphous CoSm thin films with coercivities <700 Oe have been studied previously and longitudinal recording properties have been reported. (M. Gronau, H. Goeke, D. Schuffler, and S. Sprenger, IEEE Trans. Magn. MAG-19, 1653 (1983); V. Kullmann, E. Koester, and C. Dorsch, IEEE Trans. Magn. MAG-20, 420 (1984); N. R. Belk, P. K. George, and G. S. Mowry, IEEE Trans. Magn. MAG-21, 1350 (1985)). Because of square hysteresis loops (S=1, S*=1), the noise produced by these films is high and is believed to be due to a zigzag domain-wall structure at the bit transition. Previous investigations of other Co-based alloys such as CoP, CoNiCr, CoCrTa, and CoNiPt have shown that using an underlayer of nonmagnetic polycrystalline such as Cr or W (R. Ranjan, J. Appl. Phys. 67, 4698 (1990)) helps increase coercivity by controlling grain size and morphology, improves the in-plane magnetization by providing an appropriate crystallographic texture, and reduces media noise by providing a magnetically isolated or voided microstructure. To further reduce media noise and to have a high $M_r t$ product, a multilayer media structure has been developed for CoCrTa (D. J. Sellmyer, D. Yang and J. A. Christopher, J. Appl Phys. 67, 9710 (1990) and CoCrPt (M. M. Yang, S. E. Lambert, J. K. Howard, C. Hwang, Laminated CoPtCr/Cr Films for Low Noise Longitudinal Recording, 5th Joint MMM-Intermag Conference, Jun. 18, 1991, Pittsburgh, Pa.) The present invention involves an underlayer and an overlayer in the structure of a film comprised of an alloy of at least Co and Sm.

SUMMARY OF THE INVENTION

The present invention pertains to a thin film media structure for high density longitudinal magnetic recording. The thin film media structure is comprised of a substrate. The thin film media structure is also comprised of an underlayer in contact with the substrate. There is also a film comprised of an alloy of Co and Sm, or of Co, Sm and Q, where Q can be a number of other elements, in contact with the underlayer such that the underlayer is between the substrate and the alloy film of CoSm or CoSmQ.

In a preferred embodiment, the underlayer is made of Cr of a predominantly <110> texture and there is additionally an overlayer in contact with the alloy films of CoSm or CoSmQ, an overcoat in contact with the overlayer and an organic lubricant disposed on the overcoat.

The present invention also pertains to a high coercivity media structure for longitudinal magnetic recording. The high coercivity media structure is comprised of a substrate. The high coercivity media structure is also comprised of a multi-magnetic layer comprised of at least two layers of an alloy of Co and Sm with an intermediate layer therebetween, and an underlayer in contact with the substrate and between the substrate and one of the CoSm layers.

BRIEF DESCRIPTION OF THE DRAWINGS

In the accompanying drawings, the preferred embodiment of the invention and preferred methods of practicing the invention are illustrated in which:

FIGS. 7a–7c are graphs concerning magnetic properties of CoSm, CoSmBi and CoSmTa thin films grown on a 100 nm thick Cr underlayer wherein FIG. 7a is a graph of coercivity vs. film thickness, 7b is a graph of $M_r t$ vs. film thickness and FIG. 7c is a graph of S* vs. film thickness.

DESCRIPTION OF THE PREFERRED EMBODIMENT

Figure 8A:
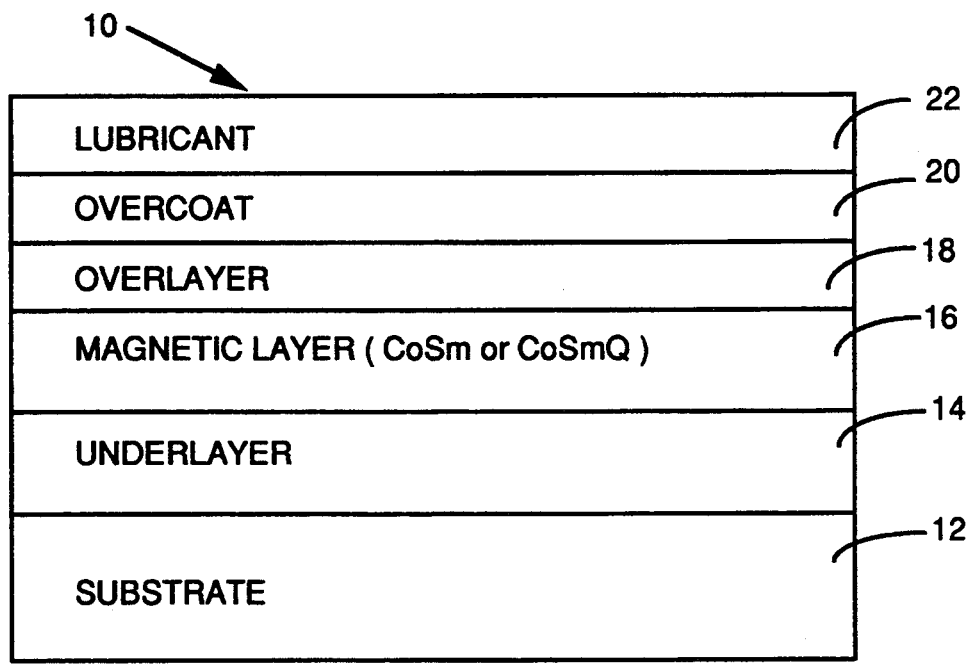
FIGS. 8a and 8b are schematic representations of a thin film structure of the present invention and a multilayer structure of the present invention, respectively.

Referring now to the drawings wherein like reference numerals refer to similar or identical parts throughout the several views, and more specifically to FIG. 8a thereof, there is shown a schematic representation of a thin film media structure 10 for longitudinal magnetic recording having low noise, high recording density and good overwritability. The structure 10 is comprised of a substrate 12. The substrate 12 can be made of either NiP coated Al or a ceramic such as canasite or preferably glass.

The structure 10 is also comprised of an underlayer 14 adjacent to and preferably in contact with the substrate 12. The underlayer 14 is 50–5000 angstroms thick and is made of W, Mo, Ti or preferably Cr or W, or most preferably Cr of a perdominantly <100> texture.

The structure 10 is additionally comprised of an alloy film comprised of CoSm or CosmQ film 16 adjacent to and preferably in contact with the underlayer 14 such that the underlayer 14 is between the substrate 12 and the alloy film of CoSm or CoSmQ film 16 the alloy film thereby forming a SmCo$_5$ crystalline interface with the underlayer 14. Preferably, the alloy film of CoSm or CoSmQ film 16 is 30–2000 angstroms thick. Q can be Ta, Mo, Bi, Zr, B, Ni, Cr and/or Pt. Q can also be any combination of these elements. Preferably, the film CoSm is of the form $Co_{1-x}Sm_x$ where $0.05 \leq x \leq 0.30$ and the alloy film CoSmQ is of the form $Co_{1-x-y}Sm_xQ_y$ where $0.05 \leq x \leq 0.30$ and $0.005 \leq y \leq 0.1$. The underlayer 14 is believed to modify the interfacial microstructure and microstructure of the CoSm film to improve its media properties.

The structure 10 can include an overlayer 18 adjacent to and preferably in contact with the CoSm or CoSmQ film 16 such that the CoSm or CoSmQ film 16 is between the overlayer 18 and the underlayer 14. The overlayer is 10–100 angstroms thick and is made of W, Ta, Zr, Ti, Y, Pt or preferably Cr, or any combination thereof. The overlayer 18 is believed to prevent oxidation.

Moreover, the structure 10 can include an overcoat 20 adjacent to and preferably in contact with the overlayer 18 such that the overlayer 18 is between the overcoat 20 and the CoSm or CoSmQ film 16. Preferably, the overcoat 20 provides a mechanical wear layer and is 30–500 angstroms thick and is made of carbon, $SiO_2$ or $ZrO_2$.

The structure 10 can also have an organic lubricant 22 disposed on the overcoat 20. Preferably, the organic lubricant 22 is 10–300 angstroms thick and is a fluorochloro carbon such as $CCl_2FCClF_2$, $CF_3(CF_2)_4CF_3$, $CF_3(CF_2)_5CF_3$, $CF_3(CF_2)_{10}CF_3$, $CF_3(CF_2)_{16}CF_3$ or a perfluoro-ether.

In the operation of the preferred embodiment, CoSm or CoSmQ films were sputtered onto 7059 Corning glass substrates, Pilkington glass substrates and NiP-coated Al substrates from a mosaic target of pieces of samarium and/or Q on cobalt by rf-diode sputtering in a Leybold Heraeus Z400 and Z650 systems. The sputtering parameters forward power, argon bleed pressure, sputtering time, and substrate temperature were varied in order to select an optimal set of variables. For the Cr underlayer the forward power was fixed at 100 W, while the argon pressure, sputtering time, and substrate temperature were varied. At 100 W forward power and 10 mTorr argon pressure, the sputtering rate for the Cr film was 11 nm per minute, while for the CoSm film it was 9 nm per minute at 50 W of rf power and 20 mTorr argon pressure. The CoSm films were deposited immediately after the Cr in order to minimize surface oxidation of Cr by any residual oxygen present in the sputtering chamber. The magnetic properties of the films were measured with a PAR model 150 VSM at a maximum field of 15 kOe. The composition of the films was analyzed by a Tracor energy dispersive x-ray fluorescence spectrometer and the thickness was measured by a Tencor alpha step profilometer. The texture of the films was studied by x-ray diffraction using CuKa radiation. The microstructure of the films was studied with a high-resolution Hitachi S-800 scanning electron microscope (SEM) and a Philips 420 transmission electron microscope (TEM) at 120 kV.

Figure 1:
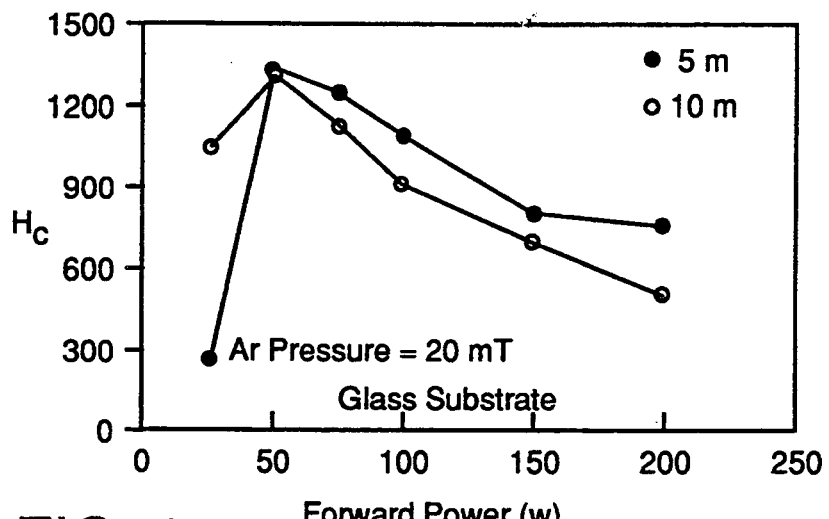
FIG. 1 is a graph of coercivity vs. forward power for CoSm thin films rf-diode sputtered on glass for 5 and 10 min. (sputtering rate at 20 mTorr and 100 W was 9 nm/min.).
Figure 2:
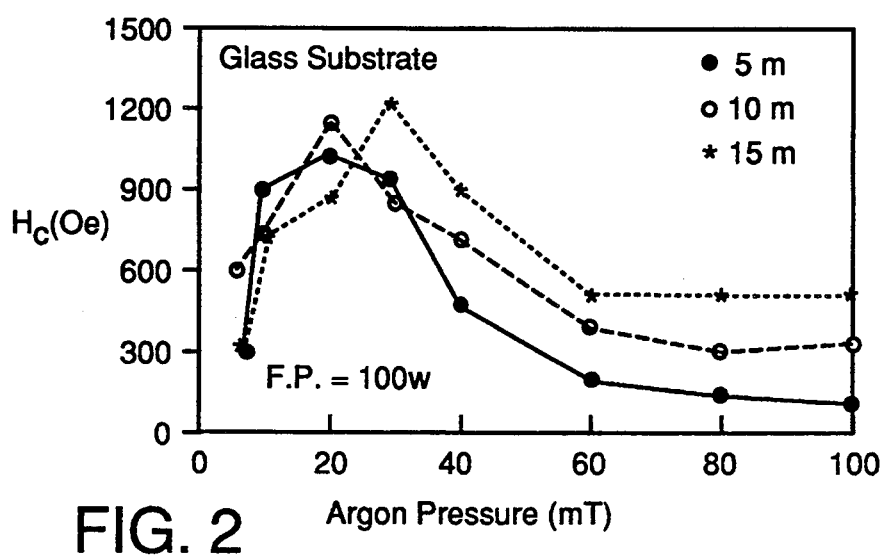
FIG. 2 is a graph of coercivity vs. argon pressure for CoSm thin films rf-diode sputtered on glass for 5, 10 and 15 min.

The nominal composition of an example film was analyzed by x-ray fluorescence and was found to be $Co_4Sm$. The intrinsic coercivity of CoSm thin films was studied by systematically varying the sputtering parameters in order to find an optimal set of variables that yields a maximum in coercivity. FIG. 1 shows that for a given argon pressure (20 mTorr) the coercivity peaks around 50 W of forward power, while FIG. 2 shows that for a given rf power (100 W) the coercivity reaches a maximum value at 20–30 mTorr argon pressure. Nearly the same coercivities are obtained for nonheated samples prepared on both glass and NiP/Al substrates. These near optimal values of 50 W rf power and 20 mTorr argon pressure, observed for CoSm films on glass, were used for further study with Cr underlayers.

Figure 3:
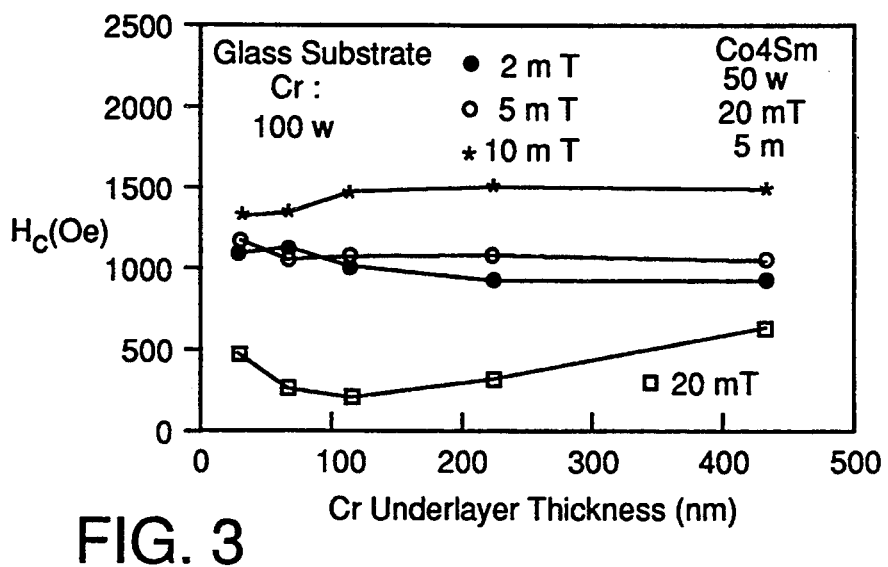
FIG. 3 is a graph of coercivity vs. Cr underlayer thickness for CoSm thin films sputtered on glass at 50 W and 20 mTorr for 5 min. on Cr underlayers sputtered at 100 W for different times at 2, 5, 10 and 20 mTorr.
Figure 4:
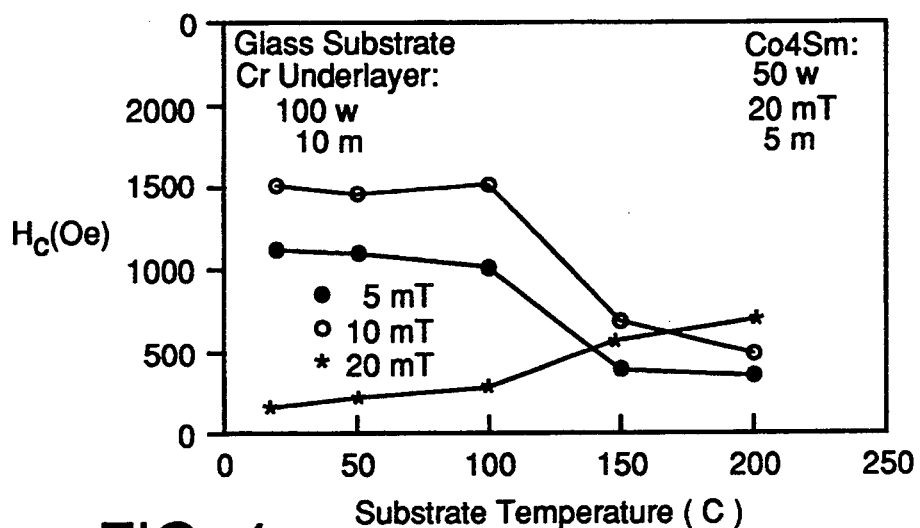
FIG. 4 is a graph of coercivity vs. substrate temperature for CoSm thin films sputtered at 50 W and 20 mTorr for 5 min. on Cr underlayers sputtered at 100 W for 10 min. at 2, 10 and 20 mTorr.

Since the grain size and morphology of the Cr underlayer is very sensitive to argon pressure, thickness of the Cr film, and substrate temperature, (D. P. Ravipathi, W. G. Haines, and J. L. Dockendorf, J. Vac. Sci. Technol. A 5, 1968 (1987); S. L. Duan, J. O. Artman, B. Wong, and D. E. Laughlin, J. Appl. Phys. 67, 4913 (1990)) a number of films were prepared where the sputtering conditions for the CoSm magnetic layer were kept constant at 50 W rf power, 20 mTorr argon pressure, and 5 min of sputtering time, while the sputtering conditions for the Cr underlayer were varied and their effect on the coercivity of CoSm studied. In FIG. 3 is shown the $H_c$-vs-Cr underlayer thickness deposited at different argon pressures. The Cr film deposited at 10 mTorr pressure gave a maximum value for coercivity. The $H_c$ increased only slightly with increasing thickness of Cr up to 100 nm and then remained constant. For the Cr deposited at 2 and 5 mTorr argon pressure, the $H_c$ decreased only slightly with increasing thickness of the Cr underlayer, whereas the lowest $H_c$ is observed at 20 mTorr for any underlayer thickness. It is reported that the grain size of Cr controls the grain size of the magnetic layer, and that the Cr underlayer provides a favorable texture for epitaxial growth of the magnetic layer in the case of CoNiCr (Ref. 15) and CoCrPt, (T. Yogi, C. Tsang, T. A. Nguyen, K. Ju, G. L. Gorman, and G. Castillo, IEEE Trans. Magn. MAG-26, 2271 (1990)) resulting in an improvement in the in-plane magnetization and coercivity. A number of CoSm films were prepared on Cr underlayers deposited at different temperatures and the coercivity as a function of the substrate temperature and argon pressure are shown in FIG. 4. At temperatures above 100° C, the $H_c$ drops for the cases where the Cr was deposited at 10 and 5 mTorr, but for the case of 20 mTorr the $H_c$ increases from a low value.

Previous work has shown that Cr films exhibit <110> texture at temperatures <260° C. and at higher temperatures <200> texture develops. (S. L. Duan, J. O. Artman, B. Wong, and D. E. Laughlin, J. Appl. Phys. 67, 4913 (1990)) The x-ray diffraction spectra of the 27-nm-thick CoSm films deposited on Cr/glass at different substrate temperatures and pressure of 20 mTorr were measured. The <110> texture of Cr present at low temperatures and the <200> texture at elevated temperatures was confirmed. The observed drop in coercivity at T>100° C. in FIG. 4 may be associated with this texture change.

Figure 5:
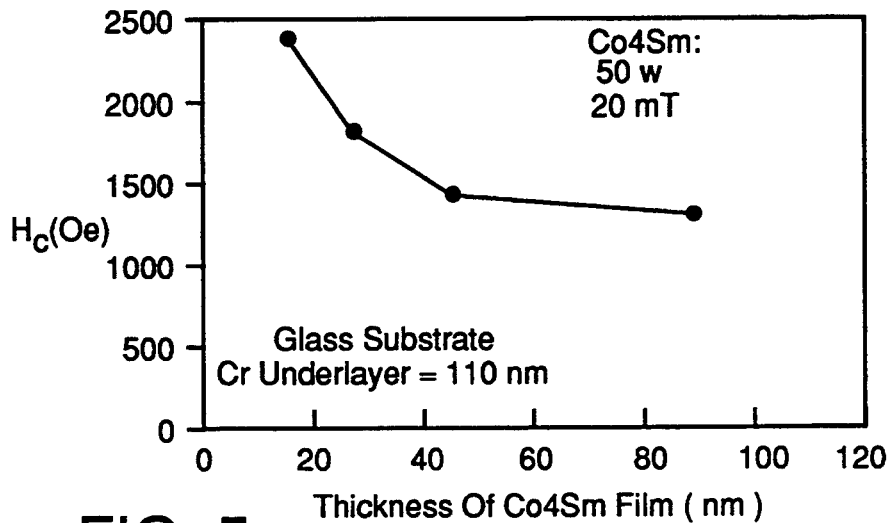
FIG. 5 is a graph of coercivity vs. thickness of CoSm film deposited on Cr underlayers of 110 nm in thickness sputtered on glass.
Figure 6:
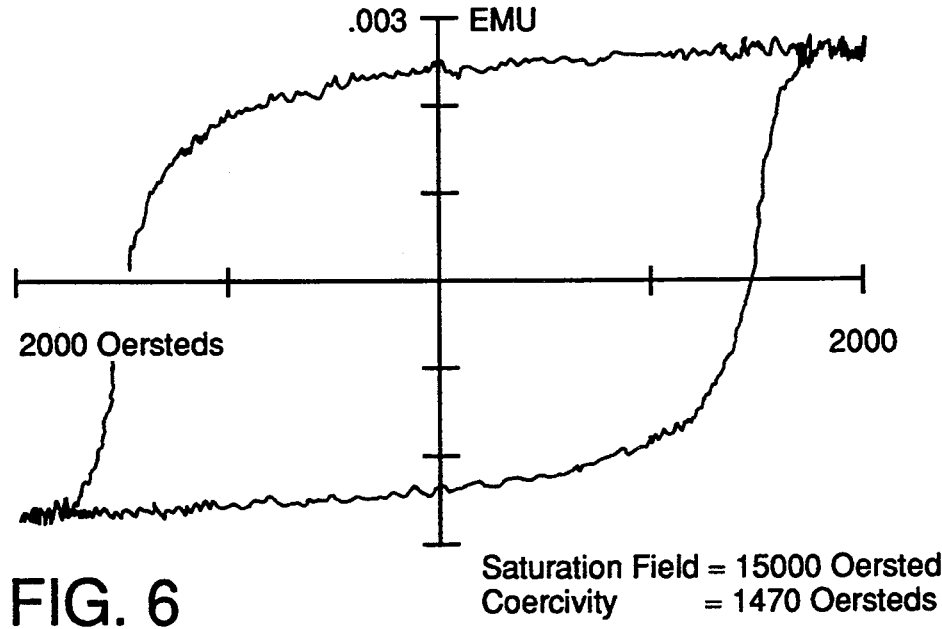
FIG. 6 is a hysteresis loop of CoSm film of thickness 45 nm deposited on Cr underlayer of 110 nm in thickness.

In FIG. 5 is shown the $H_c$ of a CoSm film sputtered under the optimal sputtering conditions both for CoSm and Cr underlayers. It is seen that the $H_c$ increases with the decreasing thickness of the CoSm film and reaches a value of 2410 Oe at a film thickness of 14 nm. The $M_s$ of these films measured at 15-kOe field was 650 emu/cm$^3$. The $M_r$, S, S*, and $M_r t$ values are listed in Table I. A typical hysteresis loop of a CoSm film of 45 nm in thickness sputtered on 110-nm-thick Cr on glass is shown in FIG. 6.

TABLE I

| Magnetic properties of CoSm films | | | | |
|---|---|---|---|---|
| Thickness (nm) | $H_c$ (Oe) | $M_r t$ (memu/cm$^2$) | S | S* |
| 90 | 1356 | 4.03 | 0.69 | 0.75 |
| 45 | 1470 | 2.46 | 0.84 | 0.89 |
| 27 | 1885 | 1.42 | 0.81 | 0.91 |
| 14 | 2410 | 0.90 | 1.00 | 0.91 |

The coercivity was observed to vary considerably with argon pressure during the deposition of CoSm. A maximum coercivity of 2410 Oe and an $M_r/M_s$ equal to 1.0 were obtained for CoSm films of 14 nm in thickness. Furthermore, when the Cr deposition pressure is <5 mTorr, there is little dependence of coercivity on Cr thickness, while a 20 mTorr pressure results in poor coercivity. The <110> texture of Cr is unaffected by the change in argon pressure. For low-pressure Cr, the coercivity decreased with higher substrate temperature, and this seems to correspond to the crystallographic texture transformation of Cr from <110> to <200> orientation. This is in direct contrast with what has been observed for other hexagonal Co-based alloys.

Figure 7A:
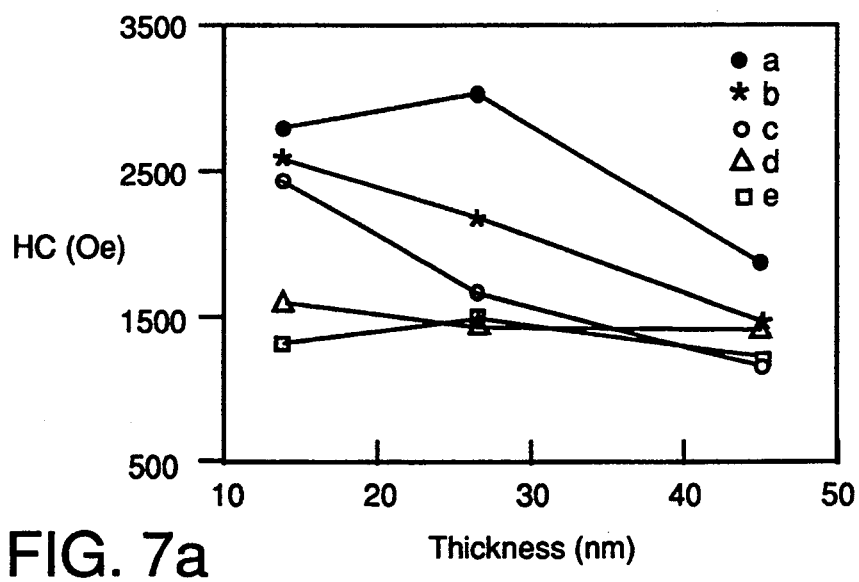
Figure 7B:
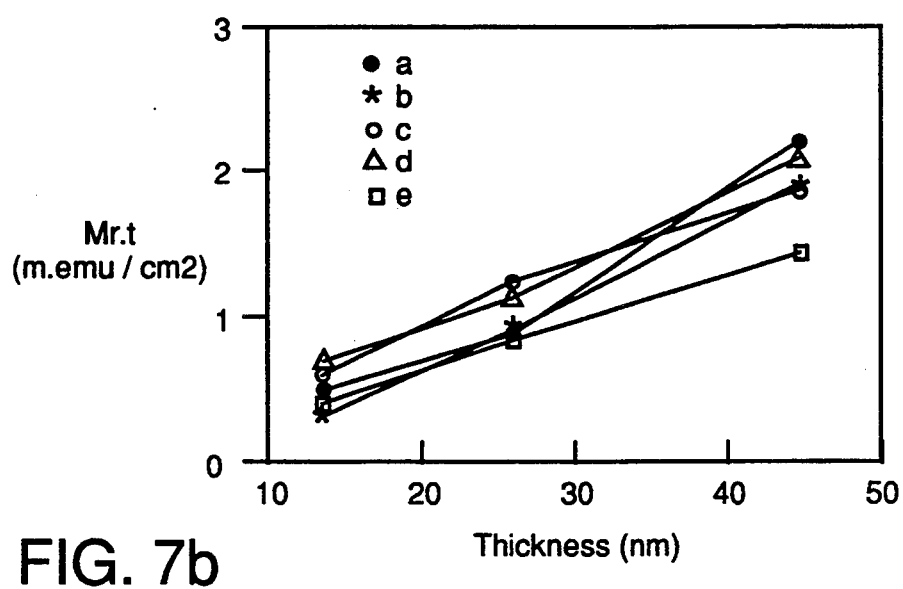
Figure 7C:
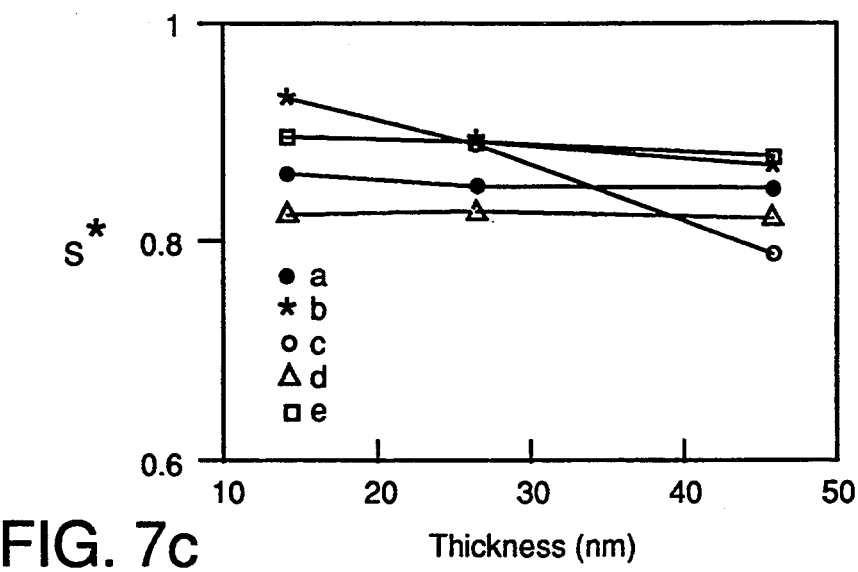

The intrinsic coercivity, remanence-thickness product ($M_r t$) and coercivity squareness (S*) for CoSm, CoSmBi and CoSmTa thin films sputtered onto a 100 nm thick Cr underlayer on glass are shown in FIGS. 7a to 7c. The sputtering parameters, forward power and argon pressure for the Cr film was 100 watts and 10 mTorr and for the CoSm based films were 50 watts and 20 mTorr. In FIG. 7a, there is shown the variation of $H_c$ with film thickness. A maximum $H_c$ of 2980 Oe was obtained for the $Co_{82}Sm_{18}$ (atomic percent) film at 27 nm thickness. The addition of both Bi and Ta to CoSm reduces coercivity. At 14 nm thickness an addition of 5 at % Bi gave a $H_c$ of 2560 Oe whereas for a film of the same thickness an addition of 5 at % Ta the $H_c$ was 1340 Oe. At a film thickness of 45 nm the difference in coercivity for the Bi and Ta containing films was within 300 Oe and ranged from 1200 Oe to 1470 Oe. For the thicker films the composition does not seem to influence the $H_c$ much. In FIG. 7b, there is shown the near linear variation of the $M_r t$ as a function of film thickness. In FIG. 7c, there is shown the coercivity squareness vs. film thickness. For all the films the S* was greater than 0.78. A deposition of 10 nm thick Cr overlayer had significant effect in increasing the coercivity of CoSm, CoSmTa and CoSmBi films. The Cr overlayer is believed to serve as a protective overcoat to CoSm based films from oxidation of Sm and the observed increase in coercivity is attributed to this.

Figure 9A:
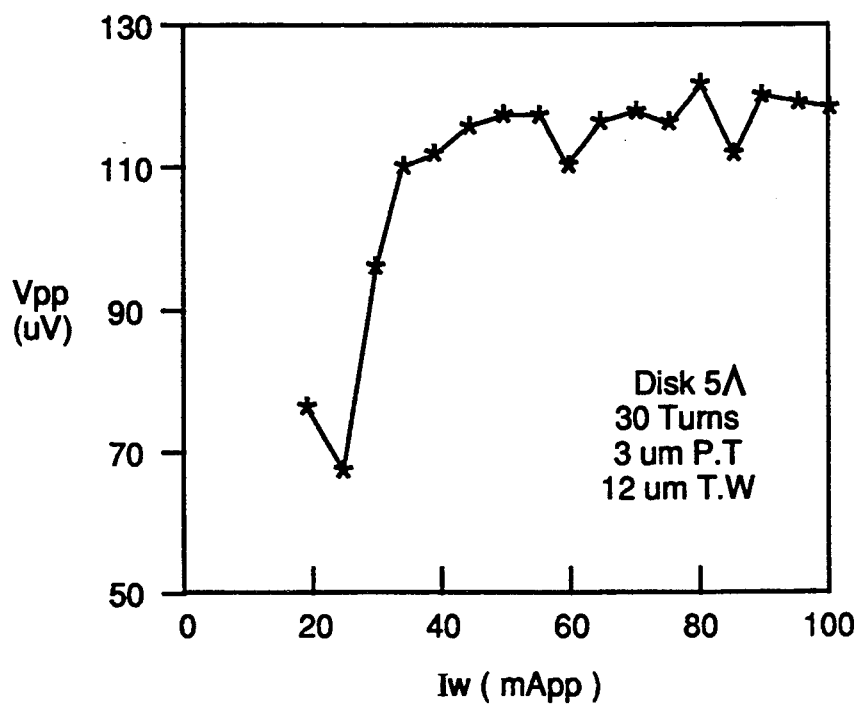
FIGS. 9a–d are graphs respectively of $V_{pp}$ vs. Iw; O.W. vs. Iw; So/Nm vs. linear density; and Nm vs. linear density, all of which are with respect to a disk, 5A, having a $H_c = 1850$ Oe and an inductive recording head which has 30 turns, 3 um P.T. and 12 um T.W.
Figure 9B:
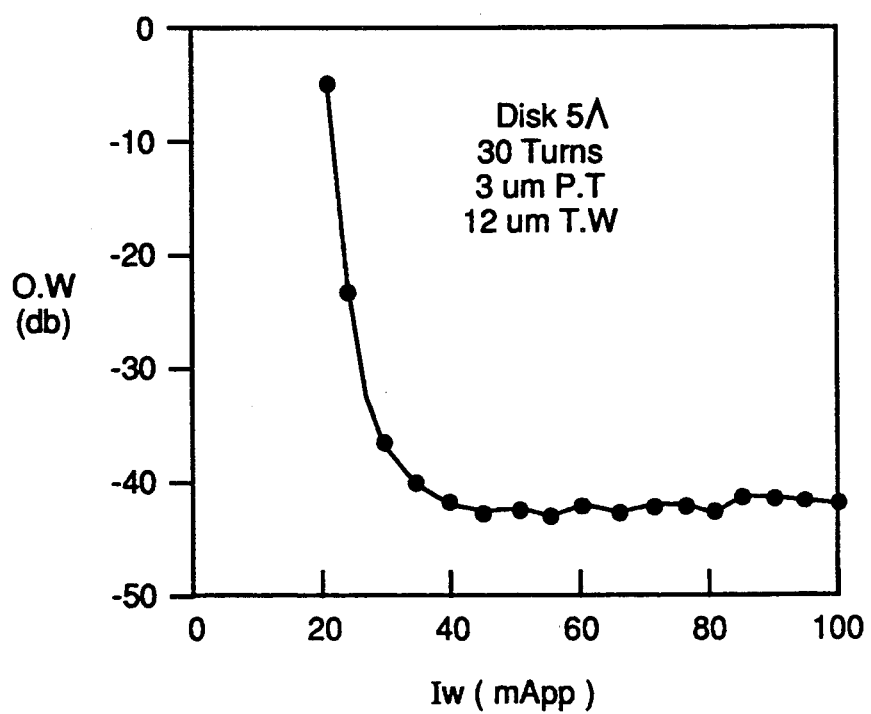
Figure 9C:
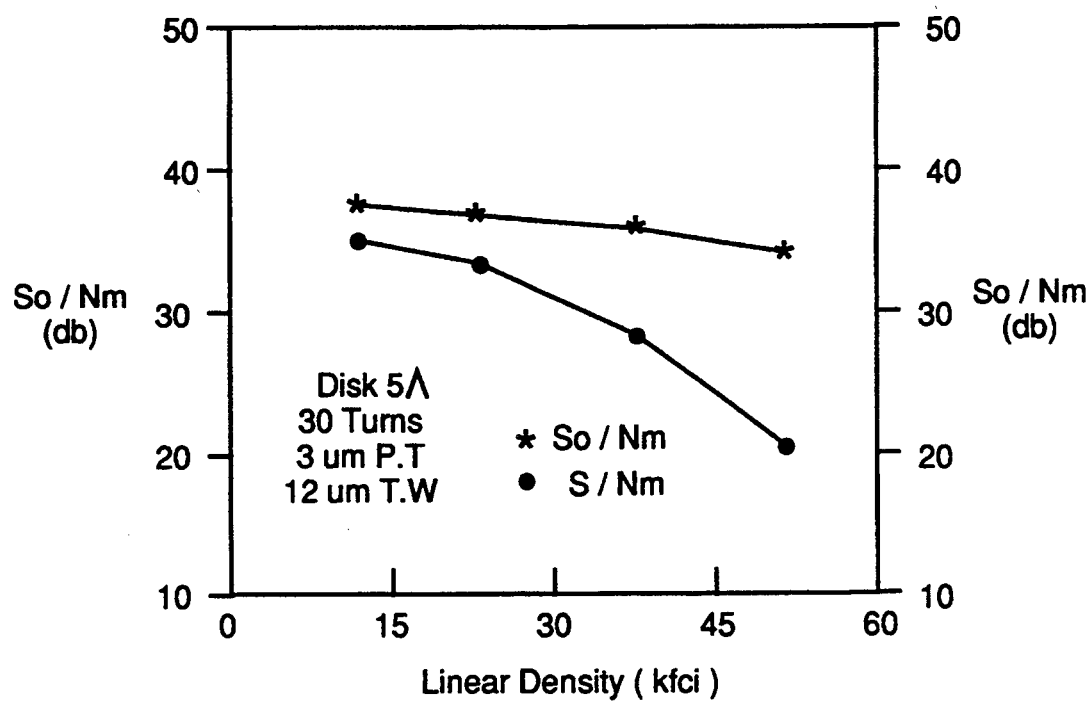
Figure 9D:
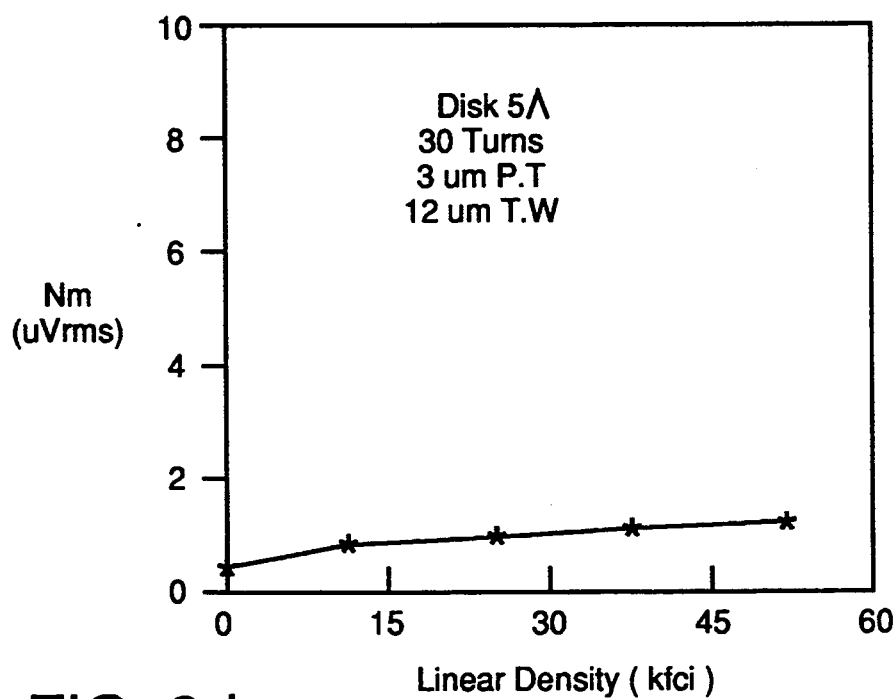

FIGS. 9a–d are graphs of recording performance for a CoSm media of disk 5A which has 1850 Oe coercivity. The recording results were obtained using an inductive thin film head with 30 turns, 3 micron thick pole tips, and a 12 micron track width. The integrated noise band width was 16 megahertz. FIG. 9a shows playback signal voltage vs. recording current and indicates the media is fully saturated at 40 milliamperes FIG. 9b shows both isolated pulse, So, and signal, S, to total integrated noise as a function of recording density. FIG. 9c demonstrates the excellent overwritability of the media. It can be seen that 40 db overwrite is achieved with less than 40 milliamperes of record current. FIG. 9d shows the total integrated media noise voltage, Nm, vs. recording density.

Figure 10:
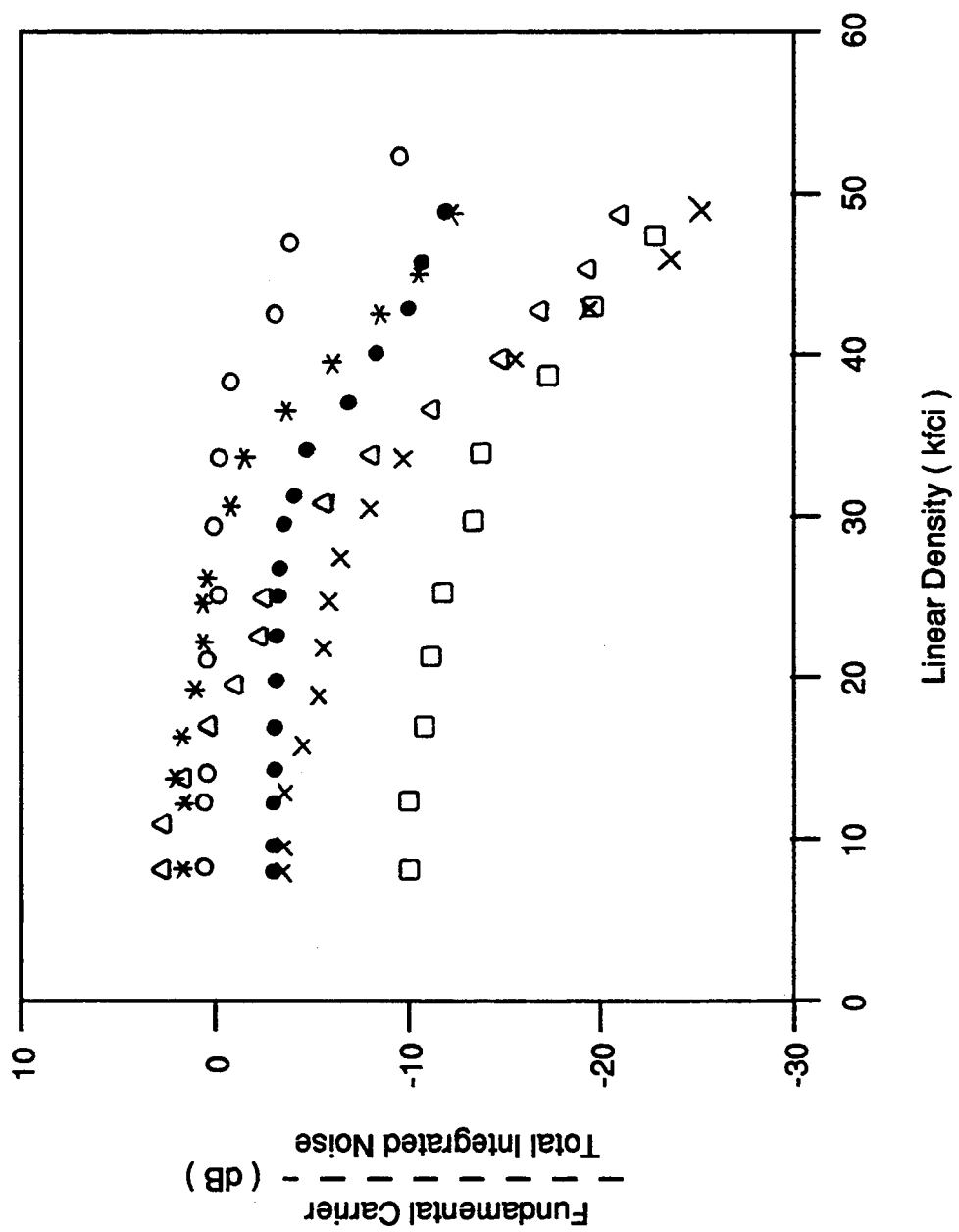
FIG. 10 is a graph of the relative fundamental carrier signal to total integrated noise ratio vs. linear density.
Figure 11:
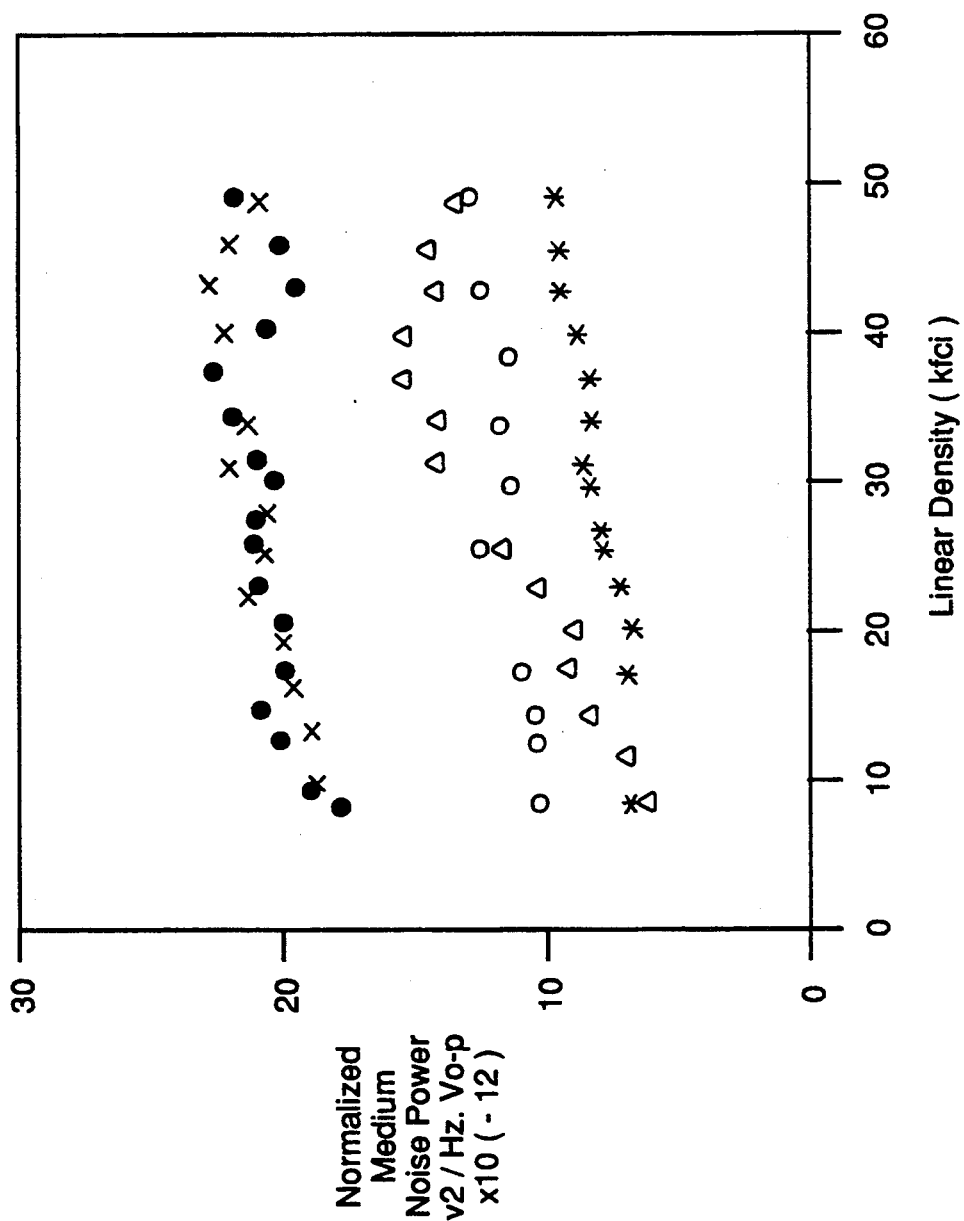
FIG. 11 is a graph of normalized medium noise power vs. linear density.

A set of CoSm and CoSmQ thin films disks were characterized for the intrinsic media noise power and relative carrier to noise ratio (CNR) and are compared to state of the art commercial media. In FIG. 10 is plotted the relative CNR vs. linear density (kfci) for four CoSm disks 7A, 8A, 3B and 18B and for a CoCrTa and a CoCrPt disk. A 20 megahertz noise bandwidth was used. The disk 7A of CoSm shows nearly constant CNR up to 40 kfci and then drops off slowly whereas for the CoCrPt and CoCrTa the CNR drops off at much lower density. The intrinsic media noise for the same set of disks are shown in FIG. 11. The media noise shows little variation with increasing density which indicates that the media noise is not localized at bit transitions.

For FIG. 10,

|  | $H_c$ (Oe) | $M_r t$ (memu/cm$^2$) |
| --- | --- | --- |
| * CoCrTa | 1030 | 2.8 |
| △ CoCrPt | 900 | 4.0 |
| ○ CoSm-7A | 1375 | 1.1 |
| ● CoSm-8A | 1900 | 1.1 |
| x CoSm-3B | 1435 | 3.5 |
| □ CoSm-18B | 790 | 3.9 |

For FIG. 11,

|  | $H_c$ (Oe) | $M_r t$ (memu/cm$^2$) |
| --- | --- | --- |
| * CoCrTa | 1030 | 2.8 |
| △ CoCrPt | 900 | 4.0 |
| ○ CoSm-7A | 1375 | 1.1 |
| ● CoSm-8A | 1900 | 1.1 |
| x CoSm-3B | 1435 | 3.5 |

Figure 8B:
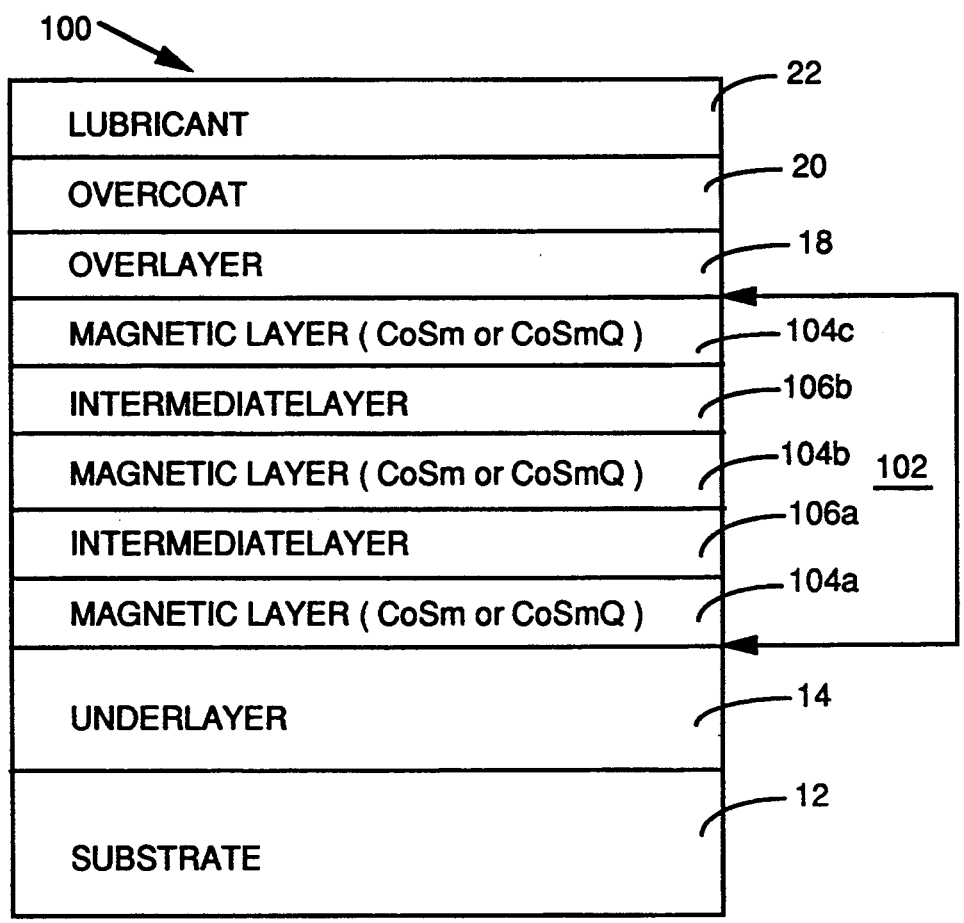

In an alternative embodiment, a high coercivity media structure 100 for longitudinal magnetic recording is shown in FIG. 8b, which is a schematic representation of the same. The structure 100 is comprised of a substrate 12. The structure 100 is also comprised of a multi-magnetic layer 102. The multi-magnetic layer 102 is comprised of at least two layers 104 of an alloy of CoSm with an intermediate layer 106 therebetween, and is in contact with an underlayer 14. The underlayer 14 is adjacent to and preferably in contact with the substrate 12 and is in between the substrate 12 and one of the CoSm layers 104. The media structure 100 can include an overlayer 18 adjacent to and preferably in contact with the multi-magnetic layer 102 such that the multi-magnetic layer 102 is between the underlayer 14 and the overlayer 18. The structure 100 can also include an overcoat 20 adjacent to and preferably in contact with the overlayer 18. There can be a lubricant 22 in contact with the overcoat 20.

Preferably, the multi-magnetic layer 102 includes a first CoSm layer 104a, a second CoSm layer 104b, and a third CoSm layer 104c. The multi-magnetic layer 102 also includes a first intermediate layer 106a and a second intermediate layer 106b disposed between the first and second CoSm layers 104a and 104b, and second and third CoSm layers 104b and 104c, respectively. The overlayer 18 and intermediate layers 106 are preferably made of Cr. The first, second and third CoSm layers 104a–c are each between 5–100 angstroms, and the intermediate layers 106a, 106b are between 5–50 angstroms.

The multi-magnetic layer 102 can essentially have an unlimited number of CoSm layers 104 and intermediate layers 106. For instance, there can be a fourth CoSm layer and a third intermediate layer. The elements described above for the various layers can also be used in the alternative embodiment for the structure 100.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is calimed is:

1. A thin film media structure having an in plane coercivity of at least 1650 oersteds for longitudinal magnetic recording comprising:
   a substrate;
   an underlayer in contact with the substrate, the underlayer being comprised of Cr, W or Mo of a predominantly <110> texture; and film comprised of an alloy of Co and Sm forming a fine grain or amorphous magnetic layer disposed on the underlayer and forming a SmCo$_5$ crystalline interface with the underlayer such that the underlayer is between the substrate and the film, the film being less than 50 nm thick.

2. A media structure as described in claim 1 wherein the underlayer is 10–5000 angstroms thick.

3. A media structure as described in claim 2 wherein the CoSm alloy film is from 30 to less than 500 angstroms thick.

4. A media structure as described in claim 1 including an overlayer in contact with the CoSm film such that the CoSm film is between the overlayer and the underlayer.

5. A media structure as described in claim 4 including an overcoat in contact with the overlayer such that the overlayer is between the overcoat and the CoSm alloy film.

6. A media structure as described in claim 5 wherein the overlayer is 10–500 angstroms thick and is comprised of Cr, W, Y or Pt.

7. A media structure as described in claim 6 wherein the overcoat is 10–500 angstroms thick and is comprised of carbon, SiO$_2$ or ZrO$_2$.

8. A media structure as described in claim 1 wherein the CoSm is of the form Co$_{1-x}$Sm$_x$ where $0.005 \leq x \leq 0.30$.

9. A thin film media structure having an in plane coercivity of at least 1650 oersteds for longitudinal magnetic recording comprising:
   a substrate;
   an underlayer in contact with the substrate, the underlayer being comprised of Cr, W or Mo of a predominantly <110> texture; and
   at least one layer of a film less than 50 nm thick comprised of an alloy of Co, Sm and Q having a fin grain or amorphous structure and forming a SmCo$_5$ crystalline interface with the underlayer such that the underlayer is between the substrate and CoSmQ film, wherein Q is selected from the group consisting of Ta, Mo, Bi, Zr, B, Ni, Cr, Pt and combinations thereof.

10. A media structure as described in claim 9 including an overlayer in contact with the CoSmQ film such that the CoSmQ film is between the overlayer and the underlayer and the overlayer is comprised of Cr, W, Y or Pt and is 10–500 angstroms thick.

11. A media structure as described in claim 10 including an overcoat in contact with the overlayer such that the overlayer is between the overcoat and the CoSmQ alloy film.

12. A media structure as described in claim 9 wherein the CoSmQ is of the form Co$_{1-x-y}$Sm$_x$Q$_y$ where $0.005 \leq x \leq 0.3$ and $0.01 \leq y \leq 0.10$.

13. A media structure as described in claim 9 including an overcoat in contact with the CoSmQ alloy film.

14. A media structure as described in claim 1 wherein there are multi-magnetic layers comprised of at least two said layers of CoSm film with an intermediate layer therebetween, said underlayer disposed between the substrate and one of the CoSm or layers.

15. A media structure as described in claim 9 wherein there are multi-magnetic layers comprised of at least two said layers of CoSmQ film with an intermediate layer therebetween, said underlayer disposed between the substrate and one of the CoSmQ layers.

16. A high coercivity media structure as described in claims 14 or 15 including an overlayer in contact with the multi-magnetic layer such that the multi-magnetic layer is between the underlayer and overlayer and the overlayer and intermediate layer are comprised of Cr.

* * * * *

UNITED STATES PATENT AND TRADEMARK OFFICE
CERTIFICATE OF CORRECTION

PATENT NO. : 5,344,706
DATED : September 6, 1994
INVENTOR(S) : David N. Lambeth, M. T. Velu It is certified that error appears in the above-indentified patent and that said Letters Patent is hereby corrected as shown below:

Col. 6, line 45, after "millamperes" add --.--.

Col. 8, line 40, delete "fin" and substitute therefor --fine--.

Signed and Sealed this

Third Day of January, 1995

*Attest:*

BRUCE LEHMAN

*Attesting Officer*     *Commissioner of Patents and Trademarks*